United States Patent [19]

Wilmot

[11] 3,727,215

[45] Apr. 10, 1973

[54] RADAR VIDEO PROCESSING APPARATUS

[75] Inventor: Richard Dean Wilmot, Fullerton, Calif.

[73] Assignee: Hughes Aircraft Company, Culver City, Calif.

[22] Filed: Apr. 2, 1965

[21] Appl. No.: 445,130

[52] U.S. Cl. .............................343/5 DP, 343/17.1 R

[51] Int. Cl. .............................G01s 7/30

[58] Field of Search ...............343/5 DP, 7 A, 17.1 R; 340/146.3

[56] References Cited

UNITED STATES PATENTS

| | | | |
|---|---|---|---|
| 3,171,119 | 2/1965 | Nuese et al. | 343/5 DP |
| 3,386,077 | 5/1968 | Molho | 343/7 A X |
| 3,430,235 | 2/1969 | Bender et al. | 343/7 A |
| 3,503,068 | 3/1970 | Yamauchi | 343/5 DP X |

*Primary Examiner*—T. H. Tubbesing
*Attorney*—James K. Haskell and Robert H. Himes

EXEMPLARY CLAIM

1. An apparatus for processing successive video sweeps generated by a radar system and quantized into a series of range bins each including a "1" or a "0" representing a target hit or no target hit, respectively, said apparatus comprising means including a memory device having a plurality of channels including 1,2,3, . . . (*n*-1), *n* channels for storing *n* quantized video sweeps from said radar system, *n* being an integer no less than three, and means for storing active bits and reject bits; means coupled to said memory device and including a read address and a write address for reading from and writing into successive range bins of said plurality of channels in a direction corresponding to increasing ranges; means coupled from said read to said write address for transferring said quantized video from said 1,2,3, . . .(*n*-1) channels to said 2,3, . . .*n* channels, respectively; means including a statistical bit detector and a first bi-stable device coupled from said *n* channels of said read address to said write address for setting said first bi-stable device in response to *m* "1's" from the respective range bins of said *n* channels thereby to generate an active bit at an output thereof, *m* being an integer less than *n;* means including a statistical miss detector and a second bistable device, said statistical miss detector being coupled from said *n* channels of said read address to said first and second bistable devices for resetting said first and second bi-stable devices in response to a predetermined number less than *m* "1's" from the respective range bins of said *n* channels; means coupled to said write address and responsive to said quantized video sweeps generated by said radar system for setting said second bi-stable device thereby to generate reject bits concurrently with a predetermined number of "1's" in a number greater than said predetermined number of successive range bins in no less than one of said quantized video sweeps, and for writing said quantized video into said 1 channel of said *n* channels; and utilization means responsive to the simultaneous availability of active bits and to the nonavailability of reject bits from said read address for processing targets detected by said radar.

6 Claims, 4 Drawing Figures

INVENTOR.
RICHARD DEAN WILMOT,
BY
Robert H. Himes
ATTORNEY.

STATISTICAL DETECTOR
(MAJORITY LOGIC DEVICE)

TYPICAL INVALID TARGET
GENERATED BY DISPERSED CLUTTER

QUANTIZED VIDEO HIT PATTERNS

RADAR VIDEO PROCESSING APPARATUS

This invention relates to apparatus including a statistical sampling device for distinguishing between valid and invalid target video returns by means of the statistical sampling of the quantized video hit returns in azimuth as well as range.

A major problem in automatic detection, acquisition and digital track-while-scan systems is the automatic processing of all of the video returns from a surveillance radar. Valid targets are usually generated by exceeding a threshold count of quantized (digitized) video hits; this is usually determined by a sequential observer type counter or a "sliding window" type threshold count detector. These devices indicate a valid radar target return when the number of digital video hits exceeds the threshold count value within a particular range increment (range bin). However, ground clutter, sea clutter, weather returns, radar interference and jamming can produce sufficient hits in a range bin to indicate a valid target return. In some systems, all target reports are stored in a computer memory and processed by a computer program to distinguish between valid and invalid target reports, while in other systems a running count of the hits in an area is made and when the count becomes too high no automatic track acquisition is allowed (all target reports are inhibited) in the area. Both of these methods require extensive equipment. The first system requires a very large memory to store the large number of invalid tracks which typically exceed 1,000 false tracks per radar antenna scan whereby a complex computer program to distinguish valid tracks from invalid tracks in memory is required. The other method, on the other hand, requires a large number of counts to be stored for determining the hit density of the respective areas. This requires storage of bits in both range and azimuth as well as count-up and count-down logic. Experience has shown that this method produces an average of 170 false tracks per scan making it rather inefficient.

In addition to the above two methods, there is the solid area matrix method described in copending application for patent, Ser. No. 440,024, entitled "Radar Video Processing Apparatus," by Richard Dean Wilmot, filed Mar. 15, 1965, which was more effective than contemporary systems because it operated much more quickly. That is, the solid area matrix method required a maximum of only three radar sweeps to detect an invalid target rather than counting hits in an area and is capable of detecting small invalid target returns that would not produce sufficient hits to affect the hit count in an area. The solid area matrix method, however, will not detect all invalid target returns; those that consist of dense but not solid hit returns from broken-up ground clutter or scattered cloud returns can still satisfy the hit criterion for a valid target. Accordingly, the statistical sampling apparatus of the present invention is intended to supplement solid area hit pattern detection and/or apparatus for counting hits in an area to improve the invalid target rejection capability for situations where the video return is broken up. Statistical sampling for clutter patterns in accordance with the invention is performed simultaneously with the target detection process. Thus, an indication can be given to a utilization device as to whether or not a target is valid or invalid at the same time target detection occurs.

It is, therefore, an object of the present invention to provide an improved apparatus for distinguishing between valid and invalid target video returns by statistical sampling of the video hit pattern during the target detection process.

Another object of the present invention is to provide a more economical and less complex apparatus for distinguishing between valid and invalid target video returns.

Still another object of this invention is to provide an apparatus capable of detecting broken-up ground clutter or scattered cloud returns in a manner superior to that of contemporary systems.

A further object of the invention is to provide an apparatus which is adapted to supplement solid hit area or counting of hits in an area pattern detection apparatus.

A still further object of the present invention is to provide a less complex and less expensive radar video data processing apparatus which further decreases the false targets in a solid hit area pattern detection or counting of hits in an area system.

In accordance with the present invention, invalid target returns are recognized and rejected on the basis of a certain statistical density of hits in the quantized video hit return patterns. This density can be controlled manually or be made a function of other hit criterial in the system. In a typical situation, hits produced from a valid target will be one radar pulse width in range and one antenna beam width wide in azimuth, i.e., the hits will occur within the same range bin for of the order of eight successive sweeps of the radar system. The apparatus of the present invention recognizes when this pattern is, in fact, broken-up clutter because of other hits in the area and causes the pattern to be rejected. The recognition of a target is achieved in the usual manner by successively sensing corresponding range bins in, for example, 11 quantized video sweeps with majority and minority logic gates to detect the leading and trailing edge of a target, respectively. If a target detected in this manner merely constitutes "broken-up clutter," it is invalid and should be rejected. The apparatus of the present invention detects broken-up clutter by statistically sensing the quantized video sweeps in azimuth. In one instance, if eight of 10 successive range bins in a single sweep are found to contain hits, all of the video in the 10 range bins is said to constitute cutter. The detection is achieved by feeding the quantized video from the radar system through a 10-stage shift register prior to being written into a target detector memory. A majority logic gate is employed to sense when the number of hits in the shift register exceeds a predetermined number in which case the area corresponding to the video in the register is designated as clutter and rejected as valid targets in the subsequent processing.

In another instance, apparently valid video is rejected as clutter if corresponding range bins in three successive video sweeps are found to contain, for example, five out of 10 hits. Or, in still another instance, rejection will occur if corresponding range bins in six out of 11 successive video sweeps contain five out of 10 hits. These techniques may be achieved by utilizing additional memory to record in azimuth when the range hit density of the quantized video exceeds a predetermined threshold together with an "and" gate to sense the density of three successive sweeps. A majority logic gate (or an accumulative up-down counter) may be used for a statistical azimuth sample to determine, for example, that six out of 11 successive sweeps exceeded the hit density thus recorded. This latter technique involves a double statistical sample: a statistical hit sampling in range and a statistical sampling of this range hit density sampled in azimuth sweeps.

The above-mentioned and other features and objects of this invention and the manner of obtaining them will become more apparent by reference to the following description taken in conjunction with the accompanying drawings, wherein.

In describing the apparatus of the present invention, a convention is employed wherein individual "and" and "or" gates are shown as semicircular blocks with the inputs applied to the straight side and the output appearing on the semicircular side. An "and" gate is indicated by a dot (·) and an "or" gate by a plus (+) in the semicircular block. As is generally known, an "and" gate produces a "one" or information level output signal only when every input is at the information level; whereas, an "or" gate produces an information level output signal when any one of the input signals applied thereto are at the information level.

Also, in addition to the above, a convention is employed in describing the particular embodiment of the present invention wherein the two inputs of the flip-flops are designated as "set" and "reset" inputs. An information level signal applied to either the set or reset inputs of a flip-flop will change its state in a manner such that an information level signal appears at the corresponding principal or complementary output terminal. Further, if infor-mation level signals are applied to both the set and reset inputs of a flip-flop, the flip-flop will revert to the reset state. If no input signals are applied, the flip-flop will remain in its previous state.

In the following description, it is presumed that flip-flops having a negligible delay time are employed whereby logic propagation is complete at the termination of each range bin or bit interval. If delay time cannot be made negligible, it becomes necessary to employ synchronizing means to compensate for the different delays which occur in processing so that the control bits are properly aligned with the quantized video bits. The use of synchronizing delay means is well known in the digital computer art. In addition, a delay in writing the reject bit can be added, if desired, to allow the leading edge of one target out of a group of multiple targets to be reported as a valid detection.

Figure 1:
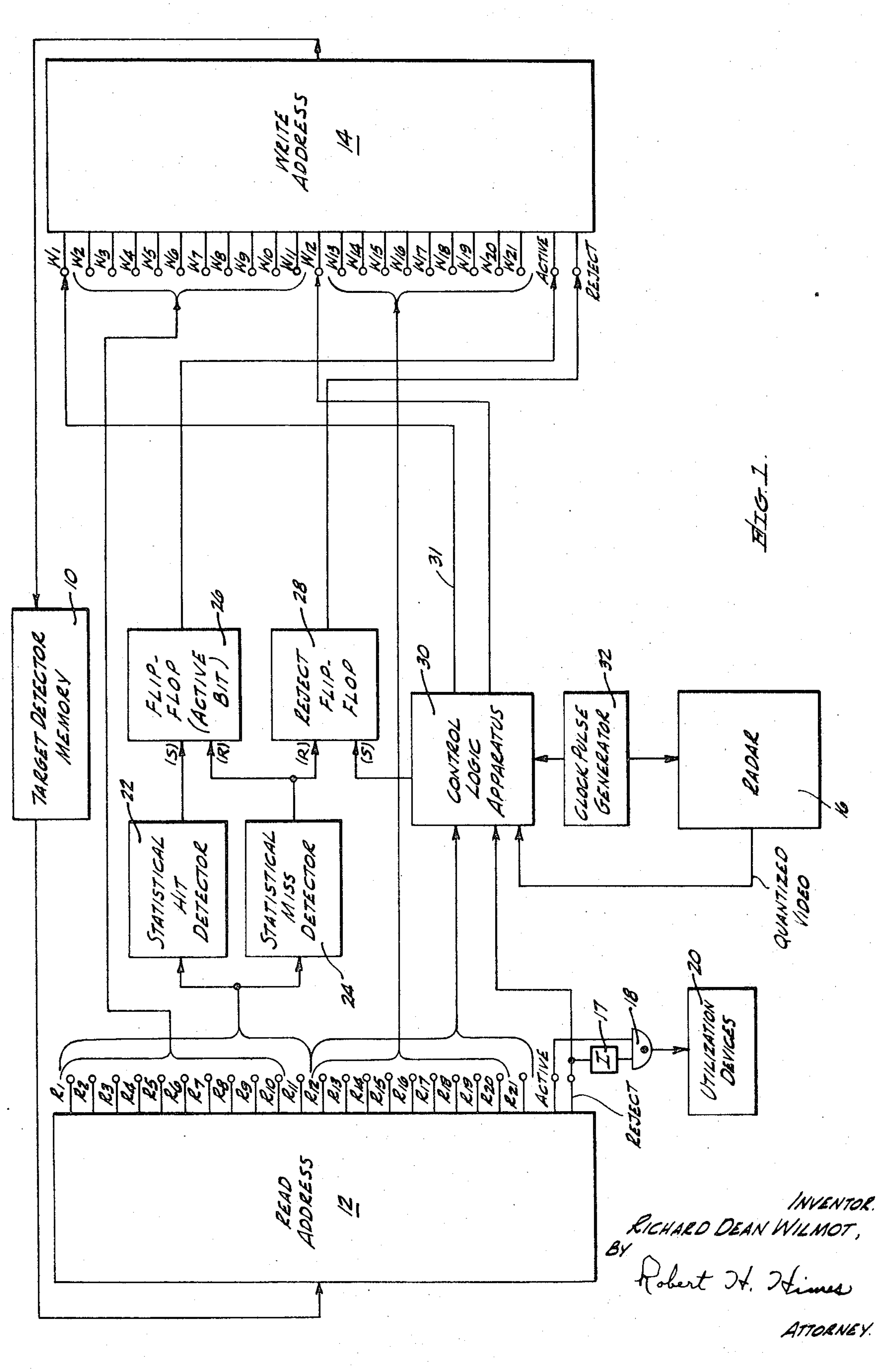
FIG. 1 illustrates a schematic block diagram of the apparatus of the present invention.

Referring now to FIG. 1 of the drawings, there is shown a schematic block diagram of an embodiment of the present invention wherein a target detector memory 10 is provided with a parallel read address 12 and a parallel write address 14. The target detector memory 10 is provided with 23 channels (bits) for use in conjunction with the apparatus of the present invention, each channel having a length of 1,024 words or "range bins." Of the twenty-three channels in target detector memory 10, 11 channels are allocated for storing quantized video sweeps from a radar system 16, 10 channels are allocated for storing the azimuth hit density of the last 10 quantized video sweeps, and the remaining two channels are allocated to the storage of an "active" bit and a "reject" bit. By way of explanation, an active bit indicates the existence of a target threshold count within the corresponding range bin for the quantized video currently stored in the target detector memory 10. A reject bit, on the other hand, indicates that a target designated by a concomitant active bit is, in fact, clutter, and, accordingly, should not be considered or used. Consequently, the reject output from the read address 12 is applied through an inverter 17 to the input of an "and" gate 18 along with the output from the active channel. Thus, a target output is received from "and" gate 18 only when there is a "one" set in the active bit channel concurrently with a "zero" in the reject channel. The output from "and" gate 18 is applied to utilization device 20 which may, for example, constitute display devices or additional computer devices for further data processing.

In the drawing, the 11 outputs from the read address 12 allocated to quantized video sweeps are designated $R_1$ to $R_{11}$ and the 10 outputs from channels allocated to storing hit density of the last 10 of these video sweeps are designated $R_{12}$ to $R_{21}$. The 11 inputs to channels allocated to the quantized video sweep channels in the write address 14, on the other hand, are designated $W_1$ to $W_{11}$, and the 10 inputs to channels allocated to storing the hit density of the video sweeps are designated $W_{12}$ to $W_{21}$. The active and reject channels have a common designation in both the read address 12 and the write address 14. The outputs from the channels $R_1$ through $R_{10}$ and $R_{12}$ through $R_{20}$ of the read address 12 are connected, respectively, to the channels $W_2$ to $W_{11}$ and $W_{13}$ to $W_{21}$ of the write address 14. Thus, each time a new quantized video sweep is received, the information in each of the channels $R_1$ to $R_{10}$ and $R_{12}$ to $R_{20}$ is moved over by one channel, and the information in channels $R_{11}$ and $R_{21}$ is abandoned. In addition to the foregoing, the outputs $R_1$ to $R_{11}$ of read address 12 are applied to the inputs of a statistical hit detector 22 and to the inputs of a miss detector 24, both of which may be majority logic gates of a type hereinafter described in connection with FIG. 3. The statistical hit detector 22, for example, is designed to provide an information level output when five or more, six or more, seven or more, eight or more, nine or more, 10 or more or 11 of the 11 inputs $R_1$ to $R_{11}$ are "1's" and a zero level output at all other times. The statistical miss detector 24, on the other hand, is designed to provide an information level output when six or more, five or less, four or less, three or less, two or less, one or less or zero of the outputs $R_1$ to $R_{11}$ are "1's". Selection of specific statistical parameters is a function of the radar beam width and other characteristics. It is evident that the statistical miss detector 24 operates in the same manner as a majority logic gate with the exception that all of the inputs are inverted whereby the miss detector 24 counts "0's" instead of "1's". The outputs from the statistical hit and miss detectors 22, 24 are connected to the set and reset inputs, respectively, of an active bit flip-flop 26. In addition, the output from the statistical miss detector 24 is connected to the reset input of a reject flip-flop 28. The principal outputs of active bit flip-flop 26 and reject flip-flop 28 are, in turn, connected to the active channel and reject channel inputs, respectively, of write address 14. In the case of the particular apparatus described, the statistical hit detector 22 is set to produce a "1" at the output thereof when eight or more of the inputs are "1's" and the statistical miss detector 24 is set to produce a "1" at the output thereof when four or fewer of the inputs are "1's". Thus, a count of eight "1's" or more out of the 11 quantized video channels within a range bin indicates that there is a target at the range corresponding to the range bin. After a target is indicated, a decrease to four or fewer "1's" in the same range bin indicates that the radar has moved off of the target. The active bit flip-flop 26 will, accordingly, be reset, thereby to erase the "1" in the active bit channel in the target detector memory 10 corresponding to the aforementioned range bin.

In addition to the above, control logic apparatus 30, in accordance with the present invention, receives quantized video from radar system 16, a clock pulse signal from a clock pulse generator 32, together with the reject output and the outputs $R_{12}$ to $R_{21}$ from the read address 12. Clock pulse generator 32 also provides synchronization to the radar system 16 so that one clock pulse occurs during each range bin of the quantized video signal. The control logic apparatus 30 provides the most recent quantized video signal from radar 16 delayed by 10 range bins which signal is available on a lead 31 that is connected to the $W_1$ input of write address 14 and an information level or binary "1" signal for 10 successive range bins when five out of 10 of the signals being delayed contain binary "1's". This latter signal is connected from the control logic apparatus 30 to the $W_{12}$ input of write address 14. In addition, control logic apparatus 30 provides a reject output which is connected to the set input of the reject flip-flop 28, the reset input of which receives signals from the output of the statistical miss detector 24 and the principal output thereof being connected to the reject channel input of write address 14, as specified above.

Figure 2:
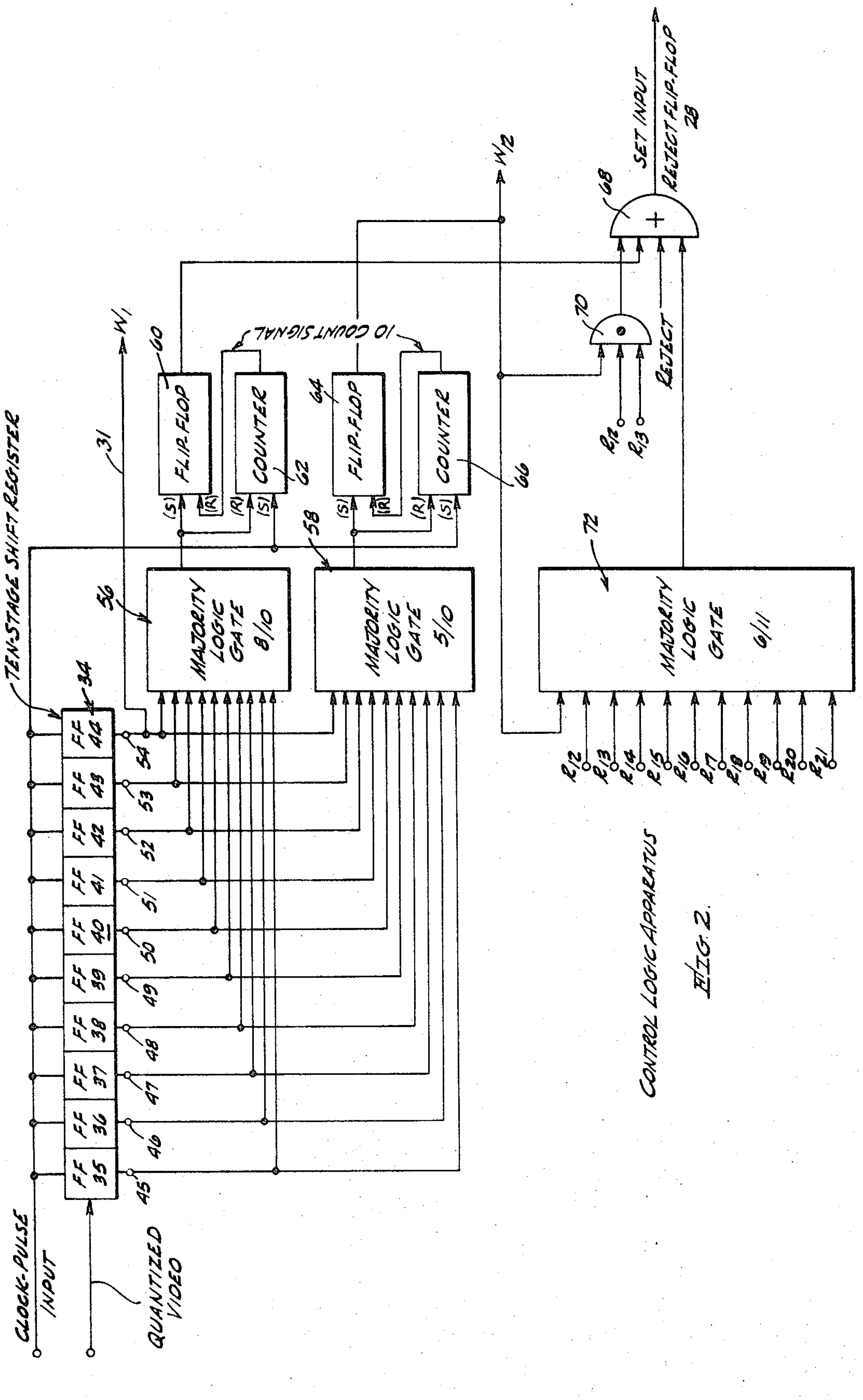
FIG. 2 shows an embodiment of the control logic in the schematic block diagram in the apparatus of FIG. 1.

Referring now to FIG. 2, there is shown a schematic block diagram of the control logic apparatus 30, FIG. 1. In particular, the quantized video sweep signal from radar 16 is applied to the input of a 10-stage shift register 34 which includes flip-flops 35–44, each of which receives a synchronizing input from clock pulse generator 32. The flip-flops 35–44 of 10-stage shift register 34 each provide an output 45–54, respectively, which show the state of the quantized video signal from the input to the output. In addition, the output 54 of flip-flop 44 is connected to the input $W_1$ of write address 14. The outputs 45–54 from the shift register 34 are connected to respective inputs of majority logic gates 56 and 58 which generate information level outputs in response to eight out of 10 and five out of 10 inputs, respectively, being at information level. The output from majority logic gate 56 is connected to the set input of a flip-flop 60 and to the reset input of a counter 62. Similarly, the output from majority logic gate 58 is connected to the set input of a flip-flop 64 and to the reset input of a counter 66. The clock pulse signal available from clock pulse generator 32 is applied to the set inputs of both of the counters 62, 66. In addition, both of the counters 62, 66 generate 10-count signals which are applied, respectively, to the reset inputs of flip-flops 60, 64. By the 10-count signal is meant a signal which remains at zero level for nine bit intervals following reset and then assumes the information level during the tenth bit interval. Thus, once set by the majority logic gates 56 or 58, the flip-flops 60, 64 will generate information level signals at the respective principal outputs thereof for 10 bit intervals. In the event the counters 62, 66 are reset to their respective reference state before the tenth bit interval is reached, the information level signal generated by the flip-flop 60 or 64 will be correspondingly lengthened. The principal output from flip-flop 60 is applied to an input of an "or" gate 68 together with the reject signal available from the read address 12. Thus, if eight hits occur within an interval of 10 range bins along the quantized video sweep being received, the majority logic gate 56 will set the flip-flop 60 which will, in turn, generate an information level signal for at least ten range bins which is applied through "or" gate 68 to the set input of reject flip-flop 28. Also, if there was a reject signal already in the target detector memory 10, this signal will be applied back through the "or" gate 68 to the set input of the reject flip-flop 28 until such time as the statistical miss detector 28 determines that there is no longer a target.

In addition to the above, it is desired to designate video as invalid in circumstances where five hits occur within corresponding intervals of 10 range bins for three successive video sweeps. This is achieved by connecting the principal output of flip-flop 64 to an input of an "and" gate 70 along with connections from $R_{12}$ and $R_{13}$ of read address 12. The outputs $R_{12}$, $R_{13}$ constitute memory as to whether the hit density for the corresponding range bins in the prior two video sweeps was five or more out of 10. The output from "and" gate 70 is connected through the "or" gate 68 to the set input of reject flip-flop 28. In addition, the principal output from flip-flop 64 is connected to the $W_{12}$ input of write address 14. Thus, when the outputs $R_{12}$, $R_{13}$ and the principal output of flip-flop 64 are all at the information level indicating that the hit density exceeded five out of 10 range bins for three successive video sweeps, an information level signal is generated at the output of "and" gate 70, which signal sets the reject flip-flop 28.

In addition to the above, it is desired to designate video as "invalid" when the hit density throughout corre-sponding range bins for 11 successive sweeps exceeds five out of 10 for six of the 11 sweeps. This is achieved by means of an 11-input majority logic gate 72 which has an input connected to the principal output of flip-flop 64 and inputs connected to the $R_{12}$ - $R_{21}$ outputs of read address 12. The output from majority logic gate 72 is, in turn, connected through "or" gate 68 to the set input of reject flip-flop 28. Majority logic gate 72 is designed to generate an information level output when no less than six inputs are at information level. Thus, when the hit density for corresponding range bins for six out of 11 video sweeps exceeds five out of 10, an information level signal is generated at the output of majority logic gate 72 which sets the reject flip-flop 28 whereby hits in the area being processed are automatically designated as clutter.

Figure 3:
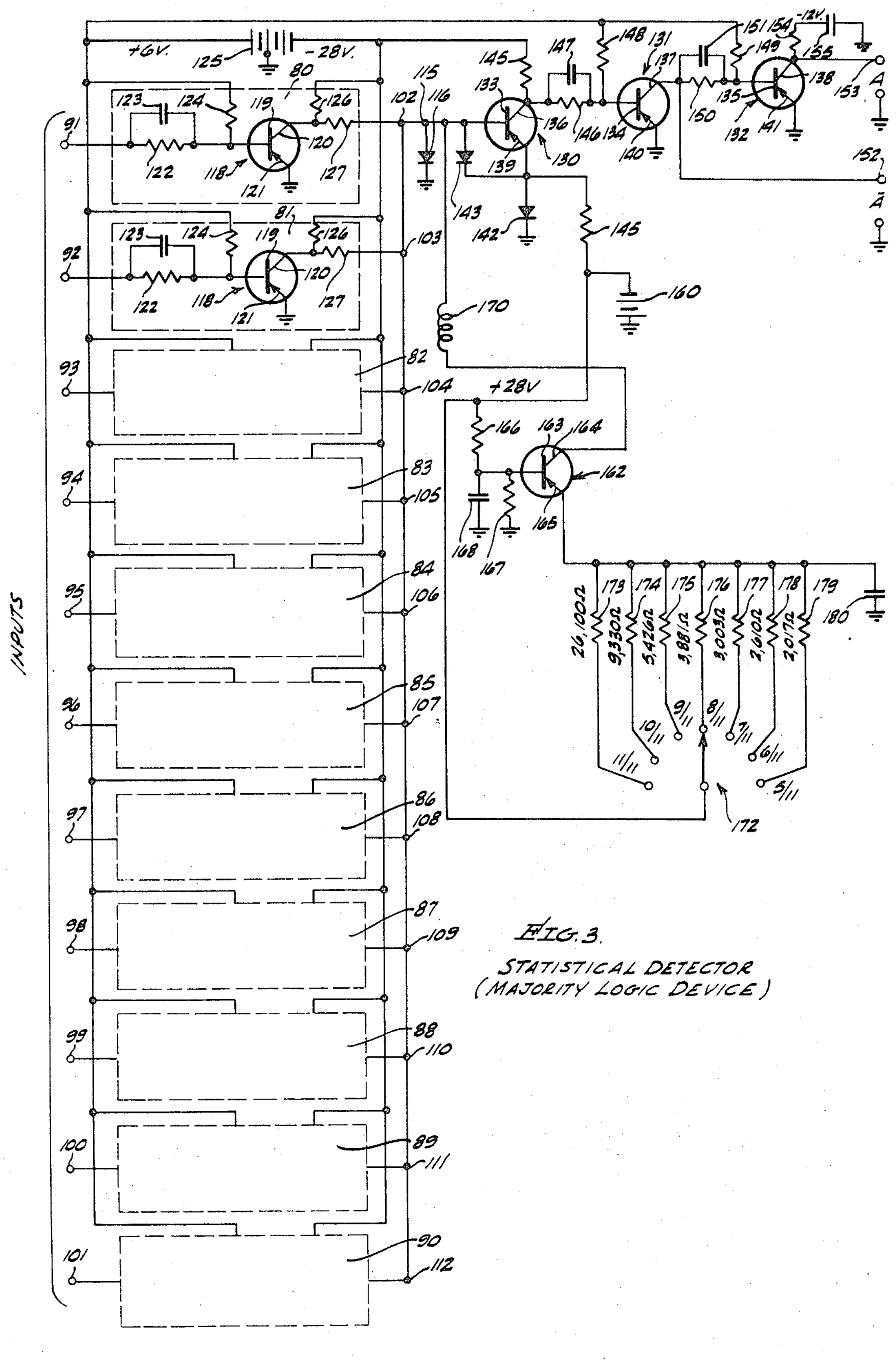
FIG. 3 shows a schematic circuit diagram of a statistical detector or a majority logic gate in the apparatus of FIGS. 1 and 2.

Referring now to FIG. 3 of the drawings, there is illustrated apparatus capable for use as the statistical detectors 22, 24 or majority logic gates 56, 58, 72, all of which operate in the same manner with the exception of statistical miss detector 24 which requires an inverter at each input to enable "0's" to be sensed rather than "1's", as previously specified. In particular, the statistical detector or majority logic apparatus of FIG. 3 includes input circuits 80–90 which have input terminals 91–101 and output terminals 102–112, respectively. The output terminals 102–112 are connected to a common junction 115 which is, in turn, referenced to ground by means of a diode 116 connected from the junction 115 to ground and poled to allow normal current flow therethrough towards ground. Each of the input circuits 80–90 include a p-n-p type transistor 118 having a base 119, a collector 120 and an emitter 121, the emitter 121 in each case being connected to ground. The base 119 of each transistor 18 is connected through a resistor 122 in parallel with a capacitor 123 to input terminals 91–101. The resistor 122 is of the order of 10,000 ohms and the capacitor 123 of the order of 27 micromicrofarads. Further, each base 119 is connected through a resistor 124 to the positive terminal of a battery 125, an intermediate terminal of which is referenced to ground. Resistor 124 is of the order of 47,000 ohms and the potential provided by battery 125 is +6 volts relative to ground. Each collector 120 of transistor 119, on the other hand, is connected through a resistor 126 to the negative terminal of battery 125 and, in addition, is connected through a resistor 127 to the respective output terminals 102–112. Resistors 126, 127 are of the order of 10,000 and 4,640 ohms, respectively, and the negative terminal of battery 125 provides a potential of –28 volts relative to ground.

In addition to the above, the apparatus of FIG. 3 includes p-n-p type transistors 130, 131, 132 having bases 133, 134, 135, collectors 136, 137, 138 and emitters 139, 140, 141, respectively. The emitters 140, 141 of transistors 131, 132 are connected directly to ground while emitter 139 of transistor 130 is connected through a diode 142 to ground and through a resistor 145 to the positive terminal of a battery 160. The diode 142 is poled to allow a normal current flow therethrough towards ground; the resistor 145 is of the order of 6,800 ohms and the battery 160 provides a potential of +28 volts relative to ground. The base 133 of transistor 130 is connected to junction 115, and in addition, is connected through a diode 143 to emitter 139, the diode 143 being poled to allow normal current flow towards the emitter 139. The collector 136 of transistor 130 is connected through a resistor 145 to the negative terminal of battery 125 and through a resistor 146 and a capacitor 147 in parallel to the base 134 of transistor 131. Resistors 145, 146 are of the order of 6,800 and 2,700 ohms, respectively, and the capacitor 147 is of the order of 100 micromicrofarads. The bases 134, 135 of transistors 131, 132 are connected, respectively, through resistors 148, 149 to the positive terminal of battery 125. The resistors 148, 149 are each of the order of 22,000 ohms. Collector 137 of transistor 131 is connected through a resistor 150 and a capacitor 151 in parallel to the base 135 of transistor 132 and, in addition, is connected to complementary output terminal 152. Next, the collector 138 of transistor 132 is connected to a principal output terminal 153 and, in addition, is connected through a resistor 154 to the negative terminal of a battery 155, the positive terminal of which is referenced to ground. The resistor 154 is of the order of 180 ohms and the battery 155 provides a potential of the order of –12 volts relative to ground.

In the operation of the apparatus of FIG. 3, as will hereinafter be explained, a predetermined flow of current is supplied the junction 115 to prevent the potential at the junction 115 from going negative until the desired number of input terminals are at information level. This current is supplied through a transistor 162 having a base 163, a collector 164 and an emitter 165. The base 163 is connected through a resistor 166 to the positive terminal of battery 160 and through a resistor 167 and a capacitor 168 in parallel to ground. Resistors 166, 167 have a resistance of the order of 13,000 ohms and 750 ohms, respectively, and the capacitor 168 a capacitance of 0.1 microfarad. The collector 164 of transistor 162 is connected through an inductor 170 directly to the junction 115 to supply the predetermined current thereto. Inductor 170 has an inductance of from 68 to 72 millihenrys. Lastly, a single-pole multi-contact selector switch 172 is employed to selectively connect resistors 173, 174, 175, 176, 177, 178 or 179 from the emitter 165 of transistor 162 to the positive terminal of battery 160. In addition, emitter 165 is bypassed to ground through a capacitor 180 having a capacitance of 8 microfarads. The resistors 173, 174, 175, 176, 177, 178, 179 have resistances substantially equal to 26,100 ohms, 9,330 ohms, 5,426 ohms, 3,881 ohms, 3,003 ohms, 2,610 ohms and 2,017 ohms, respectively. The resistors 173, 174, 175, 176, 177, 178, 179 correspond to an information level output for 11, 10, nine, eight, seven, six and five input signals at information level, respectively. Under circumstances where it is desired not to make the majority logic gate or statistical detector adjustable, it is, of course, only necessary to use the appropriate one of the resistors 173, 174, 175, 176, 177, 178 or 179.

In the operation of the apparatus of FIG. 3, the choice of a resistor 173, 174, 175, 176, 177, 178 or 179 results in a predetermined current flow into the junction 115 whereat diode 116 prevents the potential from becoming more positive than the voltage drop thereacross. Also, with false information level signals at the respective inputs 91–101, the transistor 118 maintains the junction between resistors 126 and 127 substantially at ground whereby substantially no current is drawn from the junction 115. The appearance of a true information level signal at an input 91–101, however, stops the current flow through the respective transistor 118 whereby a negative current is drawn from the junction 115. When a sufficient number of the input terminals are at information level, this negative current exceeds the positive current flowing into the junction 115 through inductor 170. The potential at junction 115 then goes negative relative to ground thereby allowing current to flow through transistor 130 which generates an information level signal "A" at the output terminal 153 and a zero level signal "$\overline{A}$" at output terminal 152.

In the operation of the statistical clutter detector system of the present invention, the radar 16 provides a quantized video sweep signal which is processed and written into the target detector memory 10 through input $W_1$ of write address 14. Subsequently, as additional quantized video sweeps are received, the stored sweeps are shifted one channel at a time by reading out channels $R_1 - R_{10}$ of read address 12 into channels of $W_2 - W_{11}$ of write address 14. The statistical hit and miss detectors 22, 24 continually sense the read out channels $R_1 - R_{11}$ to determine the leading and trailing edge of a target, if any. The statistical detectors 22, 24 activate the active and reject flip-flops 26, 28 which, in turn, record or erase the target information in the target detector memory 10 through the active and reject channels of write address 14.

Figure 4:
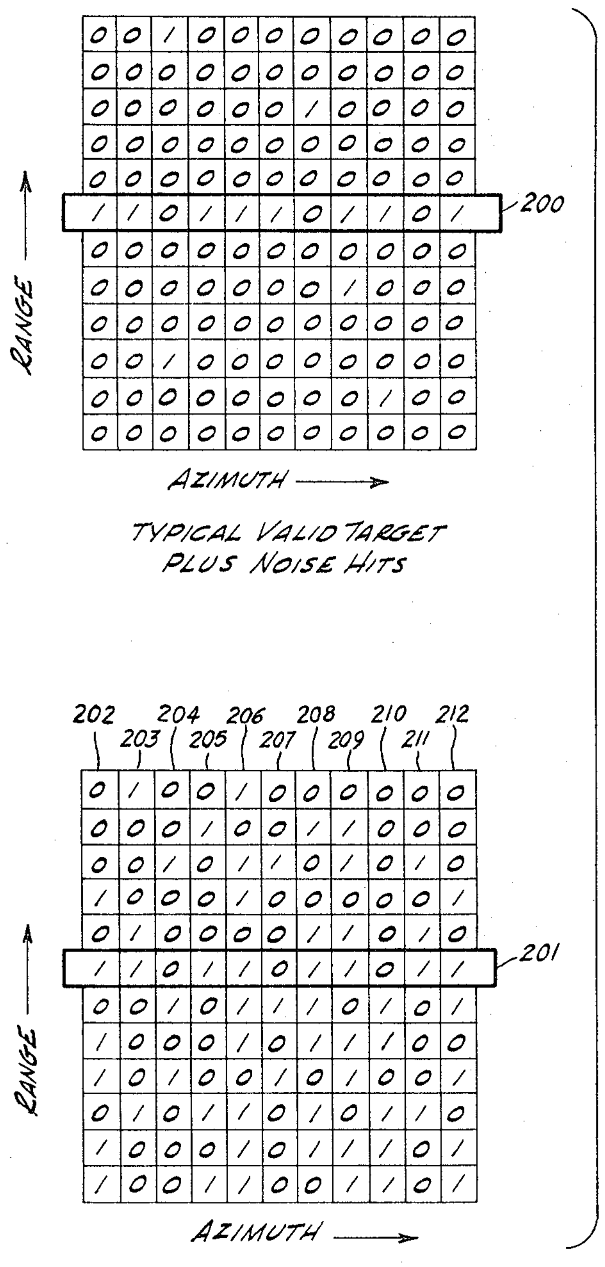
FIG. 4 shows a typical valid target and a typical broken-up clutter hit density pattern.

Referring to FIG. 4, there is shown a typical valid target with noise hits and an invalid target generated by dispersed clutter. In this figure, the quantized video sweeps, as viewed in the drawing, are vertical and the valid and invalid targets are encircled with dark lines 200, 201, respectively. In accordance with the invention, the processing of the quantized video sweep includes directing the signal through a ten-stage shift register 34 prior to storing it in the target detector memory 10. A majority logic gate 56 initially senses when eight out of 10 range bins in the shift register 34 are hits and activates the reject flip-flop 28 when this is the case thereby indicating an invalid target. In addition, a majority logic gate 58 senses when five out of 10 range bins in the shift register 34 contain hits. This information appears at the output of flip-flop 64 and is stored in target detector memory 10 through input channel $W_{12}$ of write address 14. This information corresponding to ten quantized video sweeps is stored in channels $W_{12} - W_{21}$, the prior data being shifted one channel each time a new quantized video sweep is received. That is, channels $R_{12} - R_{20}$ of read address 12 are written into channels $W_{13} - W_{21}$ of write address 14. The "and" gate 70 detects when the hit density is no less than five out of 10 during corresponding range bins for three successive sweeps and sets the reject flip-flop 28 when this is the case thereby indicating that any target which crosses these sweeps is invalid. Further, the majority logic gate 72 which is responsive to the output of flip-flop 64 together with the outputs $R_{12} - R_{21}$ of read address 12 senses the hit density of the present and the prior 10 quantized video sweeps and generates a reject signal to indicate invalid targets. In the apparatus of FIG. 2 this reject signal is generated and is applied through "or" gate 68 to the set input of reject flip-flop 28 when concurrent range bins have a hit density of five out of 10 range bins for six of the 11 sweeps being sensed.

Thus in the present system, a target is indicated by statistical hit detector 22 when eight or more out of 11 hits occur in concurrent range bins during eleven successive sweeps. Examples of such target indications are encircled by lines 200, 201, FIG. 4. In addition, the control logic apparatus 30, FIG. 2 determines whether a target, if any, is invalid. As described above, control logic apparatus 30 determines that a target is invalid when there are eight out of 10 hits in one sweep, five out of 10 hits in three successive sweeps, or five out of 10 hits in six out of 11 sweeps. Referring to FIG. 4, the target encircled by line 200 is obviously not composed of hits which meet this criteria and accordingly cannot be said to be invalid. Referring to the target encircled by line 201, on the other hand, it is seen that it is formed by hits from sweeps 202 – 212. Examination of sweep 206 reveals that the lower 10 range bins, as viewed in the drawing, includes eight hits thereby making the target invalid. Also, examination of successive sweeps 208, 209 and 210 reveals that the lower 10 range bins thereof include six, seven, and five hits, respectively, whereby the second criteria for determining that a target is invalid is met. Lastly, examination of sweeps 202 – 212 reveals that the lower 10 range bins of sweeps 202, 206, 208, 209, 210 and 212 as viewed in the drawing, include six, nine, six, seven, five and six hits, respectively, i.e., six of 11 successive sweeps include five or more out of 10 hits whereby the target is invalid. Any of the three foregoing sets of criteria result in the reject flip-flop 28 being "set" whereby the target is rejected. A target which has activated the active bit flip-flop 26 which has no concurrent reject bit generates information level signals on both inputs of "and" gate 18 whereby the target is entered into the utilization device 20.

It is, of course, evident that the particular statistics adopted in the above-described embodiment could change with weather conditions and terrain. This change may be achieved manually by merely incorporating the switch 172 in each of the majority logic gates 56, 58 and 72, or automatically by using a remotely controlled rheostat, for example, in place of the switch 172 and resistors 173–179. Digital logic level switching can also be used to change the statistical criterion.

Although the invention has been shown in connection with a certain specific embodiment, it will be readily apparent to those skilled in the art that various changes in form and arrangement of parts may be made to suit requirements without departing from the spirit and scope of the invention. For example, even though the present invention was described in connection with range and azimuth of a two-dimensional surveillance radar, it will be apparent to those skilled in the art that the same techniques also apply for range and azimuth and for range and height of a three-dimensional radar.

What is claimed is:

1. An apparatus for processing successive video sweeps generated by a radar system and quantized into a series of range bins each including a "1" or a "0" representing a target hit or no target hit, respectively, said apparatus comprising means including a memory device having a plurality of channels including 1, 2, 3, . . . $(n-1)$, $n$ channels for storing $n$ quantized video sweeps from said radar system, $n$ being an integer no less than three, and means for storing active bits and reject bits; means coupled to said memory device and including a read address and a write address for reading from and writing into successive range bins of said plurality of channels in a direction corresponding to increasing ranges; means coupled from said read to said write address for transferring said quantized video from said 1, 2, 3, . . . $(n-1)$ channels to said 2, 3, . . . $n$ channels, respectively; means including a statistical hit detector and a first bi-stable device coupled from said $n$ channels of said read address to said write address for setting said first bi-stable device in response to $m$ "1's" from the respective range bins of said$n$ channels thereby to generate an active bit at an output thereof, $m$ being an integer less than $n$; means including a statistical miss detector and a second bistable device, said statistical miss detector being coupled from said $n$ channels of said read address to said first and second bistable devices for resetting said first and second bi-stable devices in response to a predetermined number less than $m$ "1's" from the respective range bins of said$n$ channels; means coupled to said write address and responsive to said quantized video sweeps generated by said radar system for setting said second bi-stable device thereby to generate reject bits concurrently with a predetermined number of "1's" in a number greater than said predetermined number of successive range bins in no less than one of said quantized video sweeps, and for writing said quantized video into said 1 channel of said $n$ channels; and utilization means responsive to the simultaneous availability of active bits and to the non-availability of reject bits from said read address for processing targets detected by said radar.

2. An apparatus for processing successive video sweeps generated by a radar system and quantized into a series of range bins each including a "1" or a "0" representing a target hit or no target hit, respectively, said apparatus comprising means including a memory device having a plurality of channels including 1, 2, 3, . . . $(n-1)$, $n$ channels for storing $n$ successive quantized video sweeps from said radar system, $n$ being an integer no less than three, and active and reject channels for storing active bits and reject bits, respectively; means coupled to said memory device and including a read address and a write address for reading from and writing into successive range bins of said plurality of channels in a direction corresponding to increasing ranges; means coupled from said read to said write address for transferring said quantized video from said 1, 2, 3, . . . $(n-1)$ channels to said 2, 3, . . . $n$ channels, respectively; means including a statistical hit detector and a first bi-stable device coupled from said $n$ channels of said read address to said active bit channel of said write address for setting said first bi-stable device in response to $m$ "1's" from respective range bins of said $n$ channels thereby to generate an active bit in said active channel, $m$ being an integer less than $n$; means including a statistical miss detector and a second bistable device, said statistical miss detector being coupled from said $n$ channels of said read address to said first and second bistable devices for resetting said first and second bistable devices in response to a predetermined number less than $m$ "1's" from concurrent range bins of said $n$ channels thereby to clear said active and reject channels; means coupled from said read address to said write address and responsive to said quantized video sweeps generated by said radar system for writing said quantized video in said 1 channel of said $n$ channels and for setting said second bi-stable device in response to greater than a predetermined statistical hit density less than 100 percent in no less than one of said quantized video sweeps thereby to generate a reject bit in said reject channels; and utilization means responsive to the simultaneous existence of active bits in said active channel and to the non-existence of reject bits in said reject channel for processing targets detected by said radar.

3. The apparatus for processing successive video sweeps generated by a radar system and quantized into a series of range bins each including a "1" or a "0" representing a target hit or no target hit, respectively, as defined in claim 2, wherein said means coupled from said read address to said write address and responsive to said quantized video sweeps generated by said radar system for writing said quantized video in said 1 channel of said $n$ channels and for setting said second bi-stable device in response to greater than a predetermined statistical hit density less than 100 percent in no less than one of said quantized video sweeps includes a multiple-stage shift register for delaying said quantized video sweeps, said register having an input responsive to said quantized video sweeps and an output connected to said 1 channel of said $n$ channels; and an additional statistical hit detector having a plurality of inputs connected to a corresponding plurality of successive stages of said shift register and an output coupled to said reject channel of said write address for generating said reject bits concurrent with a predetermined density of "1's" in said shift register equal to or greater than said predetermined statistical hit density less than 100 percent.

4. The apparatus for processing successive video sweeps generated by a radar system and quantized into a series of range bins each including a "1" or a "0" representing a target hit or no target hit, respectively, as defined in claim 2, wherein said means coupled from said read address to said write address and responsive to said quantized video sweeps generated by said radar system for writing reject bits in said reject channel concurrent with a predetermined statistical hit density less than 100 percent in no less than one of said quantized video sweeps and for writing said quantized video in said 1 channel of said $n$ channels includes a multiple-stage shift register for delaying said quantized video sweeps, said register having an input responsive to said quantized video sweeps and an output connected to said 1 channel of said $n$ channels; an additional statistical hit detector having a plurality of inputs connected to a corresponding plurality of successive stages of said shift register and an output connected to said write address for generating information level pulses concurrent with a predetermined density of "1's" in said shift register; and means responsive directly to said information level pulses generated by said additional statistical hit detector and responsive to said information level pulses available from said read address for setting said second bi-stable device thereby to generate said reject bits when said information level pulses occur concurrently for no less than three successive quantized video sweeps.

5. The apparatus for processing successive video sweeps generated by a radar system and quantized into a series of range bins each including a "1" or a "0" representing a target hit or no target hit, respectively, as defined in claim 4, wherein said means responsive to said information level pulses includes first and second additional channels in said memory device for storing information corresponding to two quantized video sweeps and means for "anding" the output from said first and second additional channels and said information level pulses.

6. The apparatus for processing successive video sweeps generated by a radar system and quantized into a series of range bins each including a "1" or a "0" representing a target hit or no target hit, respectively, as defined in claim 2, wherein said means coupled from said read address to said write address and responsive to said quantized video sweeps generated by said radar system for writing reject bits in said reject channel concurrent with a predetermined statistical hit density less than 100 percent in no less than one of said quantized video sweeps and for writing said quantized video in said 1 channel of said *n* channels includes a multiple-stage shift register for delaying said quantized video sweeps, said register having an input responsive to said quantized video sweeps and an output connected to said 1 channel of said *n* channels; an additional statistical hit detector having a plurality of inputs connected to a corresponding plurality of successive stages of said shift register and an output for generating information level pulses concurrent with a predetermined density of "1's" in said shift register; means including additional channels in said memory device coupled to said output of said additional statistical hit detector for storing said information level pulses corresponding to a predetermined number of said quantized video sweeps; and means connected to said read address for generating a reject bit upon the simultaneous occurrence of a selected density of information level pulses each of which correspond to the same range bin, said reject bit being applied to said reject channel of said write address.

* * * * *